United States Patent [19]

Rich

[11] Patent Number: 4,604,442
[45] Date of Patent: Aug. 5, 1986

[54] ORGANOPOLYSILOXANE-POLYAMIDE BLOCK POLYMERS AND METHOD FOR MAKING

[75] Inventor: Jonathan D. Rich, Ballston Lake, N.Y.

[73] Assignee: General Electric Company, Schenectady, N.Y.

[21] Appl. No.: 718,038

[22] Filed: Mar. 29, 1985

[51] Int. Cl.$^4$ .............................................. C08G 77/04
[52] U.S. Cl. ...................................... 528/28; 528/33; 528/34; 528/38; 525/474
[58] Field of Search ...................... 528/28, 34, 33, 38; 525/474

[56] References Cited

U.S. PATENT DOCUMENTS

| | | | |
|---|---|---|---|
| 2,754,284 | 7/1956 | Speck | 528/26 |
| 2,973,383 | 2/1961 | Black | 528/28 |
| 3,598,783 | 8/1971 | Holub et al. | 528/20 |

OTHER PUBLICATIONS

Silicon-Containing Condensation Polymers, Speck, Journal of Organic Chemistry, 18, pp. 1689-1700 (1953).
Synthese et Modification de Polysiloxanes Aromatiques, Bonnet et al., Bull. Chem. Soc., Fr. 3561-3579 (1972).
Chemical Abstracts, Symmetrical Tetramethyldiphenyldisiloxane-4,4'-dicarbonyl Chloride, Mal'nova et al., Plasticheskie Massy (1962) No. 11, 19.
Synthesis of Chlorides of Silicon-Containing Arylcarboxylic Acids, Mal'nova et al., translated from Zhurnal Obshchei Khimii, vol. 34, No. 2, pp. 618-619 (1964).
The Oxidation of Tetramethyl-1,3-bis-(p-tolyl)-disiloxane to 1,3-Bis-(p-carboxyphenyl)-tetramethyldisiloxane, Lewis et al., Journal of American Chemical Society, vol. 74, pp. 2931-2933 (1952).
Über die Einwirkung von Thionylchlorid auf Tetramethyldiphenyldisiloxan-4,4'-dicarbonsäure, Micheev et al., Journal für praktische Chemie. 4. Reihe. Band 23 (1964).

*Primary Examiner*—Melvyn I. Marquis
*Attorney, Agent, or Firm*—William A. Teoli; James C. Davis, Jr.; James Magee, Jr.

[57] ABSTRACT

A method is provided for making silicone-polyamides by effecting reaction between aroylhalide terminated organosiloxane and organic diamine. Optionally, organic polyacid halide can be used in combination with the aroylhalide terminated organosiloxane when reaction is effected with the organic diamine.

8 Claims, No Drawings

ORGANOPOLYSILOXANE-POLYAMIDE BLOCK POLYMERS AND METHOD FOR MAKING

CROSS REFERENCE TO RELATED APPLICATIONS

Reference is made to my copending application Ser. No. 647,332, filed Sept. 4, 1984, for Silylation Method, now abandoned, and copending application Ser. No. 718,039, filed Mar. 29, 1985, for Method for Making Silylaroylhalides and Reaction Products, filed concurrently herewith, where both applications are assigned to the same assignee as the present invention and incorporated herein by reference.

BACKGROUND OF THE INVENTION

Prior to the present invention, as shown by Speck, U.S. Pat. No. 2,754,284, certain silicone-polyamide block polymers were obtainable by effecting reaction between carboxyphenyl terminated polydiorganosiloxane having up to about five chemically combined polydiorganosiloxy units and an organic diamine or bis(p-aminomethylphenyl)dimethylsilane. As shown by Speck, extreme conditions are required to effect the formation of the silicone polyamide, since an amine salt is formed between the carboxy terminated diorganosiloxane and the organic diamine or bisaminoorganodisilane. In addition to temperatures required in the range of from 180° to 300° C., the polymerization can be carried out at subatmospheric or superatmospheric pressures in particular instances.

The present invention is based on the discovery that polydiorganosiloxane having an average of about 7 to about 2000 chemically combined diorganosiloxy units and terminal units having the formula,

(1)

where R is selected from halogen, $C_{(1-13)}$ monovalent hydrocarbon radicals, substituted $C_{(1-13)}$ monovalent hydrocarbon radicals and mixtures thereof, $R^1$ is selected from divalent $C_{(6-13)}$ aromatic organic radical and X is a halogen radical, can be combined with organic polyacid halide and organic diamine, or diamino substituted organosilicon material, or mixtures thereof, at ambient temperature in the presence of an organic solvent and base, and thereafter agitated to produce an organopolysiloxane-polyamide block polymer useful as a solvent resistant rubber or a silicone elastomeric adhesive.

STATEMENT OF THE INVENTION

There is provided by the present invention, silicone-polyamide block copolymers comprising chemically combined blocks of polydiorganosiloxane having from about 7 to about 2000 chemically combined diorganosiloxy units and terminal groups having the formula,

(2)

joined to the nitrogen atoms of the polyamide blocks, where the silicone-polyamide block copolymers comprise from 5 to 95% of polydiorganosiloxane by weight, based on the weight of silicon-polyamide block polymer and the organo radicals attached to silicon are selected from $C_{(1-13)}$ monovalent hydrocarbon radicals, substituted $C_{(1-13)}$ monovalent hydrocarbon radicals and mixtures thereof, $R^1$ is as previously defined and $R^2$ is selected from —O— and the aforementioned organo radicals attached to silicon.

There is also provided by the present invention method for making organopolysiloxane-polyamide block polymers which comprises (1) effecting reaction between an organic diamine or organic silicon diamine and poly(diorganosiloxane) having an average of about 7 to 2000 chemically combined diorganosiloxy units and terminal groups of formula (1) or a mixture of such polydiorganosiloxane and organic polyacidhalide, in the presence of water and base, and (2) recovering organopolysiloxane block polymer from the mixture of (1).

Polydiorganosiloxane and methods for making such materials having terminal groups of formula (1) can be found in my copending application Ser. No. 718,039, filed Mar. 29, 1985. These halosilylaroyl terminated polydiorganosiloxanes can be made by effecting reaction between silanol terminated polydiorganosiloxane having the formula

(4)

where $R^4$ is selected from the organo radicals attached to silicon as set forth in the Statement of the Invention and n is an integer equal to from about 7 to about 2000 inclusive, and a halosilylaroylhalide of the formula,

(5)

where R, $R^1$ and X are as previously defined.

Radicals included within R of formula (1) and the organo radicals attached to silicon in the Statement of the Invention are, for example, $C_{(1-8)}$ alkyl radicals such as methyl, ethyl, propyl, butyl, pentyl, hexyl, $C_{(6-13)}$ aryl radicals such as phenyl, tolyl, xylyl, halophenyl, bromotolyl. Radicals included within $R^1$ of formula (1) are, for example, $C_{(6-13)}$ arylene radicals such as phenylene, tolylene, xylylene. Radicals included within $R^2$ of formula (3) are, for example, $C_{(1-8)}$ alkyl radicals and mixtures theeof included within R.

Some of the diamines which can be utilized in the practice of the present invention to make the organopolysiloxane-polyamide block polymers, are for example, m-phenylenediamine;
p-phenylenediamine;
4,4'-diaminodiphenylpropane;
4,4'-diaminodiphenylmethane; benzidine;
4,4'-diaminodiphenylsulfide;
4,4'-diaminodiphenylsulfone;
4,4'-diaminodiphenyl ether;
1,5-diaminonapthalene;
3,3'-dimethylbenzidine;

3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
haptamethylenediamine;
nonamethylenediamine;
decamethylenediamine;
bis-(3-aminopropyl)tetramethyldisiloxane;
bis-(4-aminobutyl)tetramethyldisiloxane;
bis(aminomethylphenyl)dimethylsilane.

Some of the polyacylhalides which can be used in combination with the halosilylaroyl terminated polydiorganosiloxane to make the organopolysiloxane-polyamide block polymers of the present invention are, for example, polyacid chlorides of the following acids: oxalic acid, malonic acid, succinic acid, glutaric acid, adipic acid, maleic acid, fumeric acid, phthalic acid, isophthalic acid, terephthalic acid, diphenic acid.

Organopolysiloxane polyamide block copolymers of the present invention can be blended with various fillers, such as glass fibers, fumed silica, calcium carbonate, carbon black, titanium dioxide, etc.

There can be utilized from 1 to 80 parts of filler, per 100 parts of the block copolymer.

In the practice of the method of the present invention, the organopolysiloxane-polyamide block copolymer, hereinafter referred to as "block copolymer" can be made by the interfacial polymerization of diamine and the polydiorganosiloxane having terminal groups of formula (1) which can optionally be combined with the aromatic polyacylhalide as previously defined. Depending upon such factors as the block length of the polydiorganosiloxane or a blend thereof with the aromatic polyacylhalide and the nature of the diamine, the properties of the resulting block copolymer can vary widely. Preferably, the resulting block copolymers are silicone elastomeric adhesives or tough silicone rubbers. However, in particular instances, where for example, a relatively short block length of the polydiorganosiloxane is used or a large proportion of aromatic polyacylhalide, the resulting block copolymers can have nylon-like properties.

Intercondensation temperatures which can be used are, for example from 10° C. to 95° C. Organic solvents which can be used to facilitated the reaction are, for example, methylene chloride, chloroform, tetrachloroethylene, chlorobenzene, etc.

It is preferred that the reaction be conducted in the presence of a base catalyst. Among the base catalysts which can be used to effect the intercondensation reaction are, for example, triethylamine, diisopropylmethylamine, sodium carbonate, etc.

The following examples are for the purpose of illustrating the practice of the present invention and not for the purpose of limitation thereto. All parts are by weight unless otherwise indicted.

EXAMPLE 1

There was added at room temperature, a solution of 45 grams of a silanol terminated polydimethylsiloxane having an average of about 500 chemically combined dimethylsiloxy units dissolved in 150 ml of dry toluene to 40 grams of p-chlorodimethylsilylbenzoyl chloride. A constant vacuum of 20 torr was maintained to facilitate removal of HCl gas. Upon completion of the addition, a mixture which had been stirring, was stirred for an additional two hours to insure complete reaction. The toluene was then removed by evaporation from the mixture. There was obtained a two phase mixture consisting of a silicone fluid and excess chlorosilane. The chlorosilane was removed and the remaining material was heated to 120° C. at 0.1 torr. Based on method of preparation, there was obtained a polydimethylsiloxane having the formula,

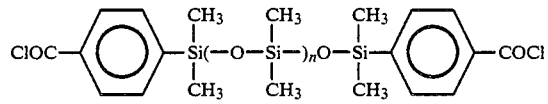

where n has a value of about 500. Its identity was further confirmed by IR and proton NMR.

The same procedure was repeated, except that there was utilized a silanol terminated polydimethylsiloxane having an average of about 165 chemically combined dimethylsiloxy units and initial viscosity of 2880 cps. The polydimethylsiloxane polymer obtained had the formula

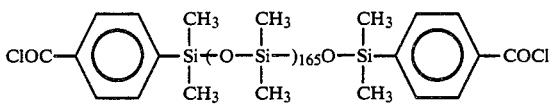

Its identity was further confirmed by NMR and IR and its final solution viscosity was 2920 cps.

There was stirred rapidly a solution of 5.85 grams (0.05 m) of N',N-diethylenediamine and 10.6 grams (0.1 m) of sodium carbonate and 250 ml of water. There was added to this solution, a solution containing 6.5 grams of the above benzoyl chloride end-capped polydimethylsiloxane fluid having an average of about 165 polydimethylsiloxy units dissolved in 50 ml of dry chloroform. The resulting mixture was stirred for 45 seconds. There was then added to the resulting mixture, an 80 ml chloroform solution containing 10.1 grams of terephthaloylchloride which was rapidly introduced and the resulting mixture was stirred for 10 minutes at high speed. The mixture was then allowed to settle resulting in two phases. The organic phase was separated and the solvent was removed to produce 8.3 grams of a white solid or 43% of isolated yield. The product was found to be soluble in chloroform and methylene chloride. Based on method of preparation, the product was a polydimethysiloxane polyamide block polymer consisting essentially of polydimethylsiloxane blocks chemically combined to amide or polyamide blocks through interconnecting groups having the formula,

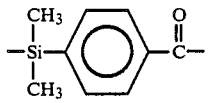

The identity of the block polymer was further confirmed by IR analysis. The 20% methylene chloride solution was cast into a 10 micron film which was found to be a transparent, tough rubber material.

EXAMPLE 2

A solution of 5.8 grams (0.05 mole) of hexamethylenediamine and 10.6 grams (0.1 mole) of sodium carbonate, was dissolved in 250 ml of water and then stirred. While the aforementined solution was stirring, there was rapidly poured into the mixture 80 ml of a methylene chloride solution containing 6.5 grams of the polydimethylsiloxane having an average of about 500 chemically combined dimethylsiloxy units and terminal benzoyl chloride groups of Example 1. After one minute, a solution containing 10.55 grams (0.05 mole) of adipoyl chloride was quickly introduced and the entire mixture was stirred at room temperatures for 10 minutes. The resulting precipitate was washed several times with water and then poured into 500 ml of boiling water which removed the methylene chloride solvent. After filtration, there was obtained 12.1 gram or a 63% yield of product after it had been dried for 24 hours at 80° C./0.1 torr. The product was a white material which was not soluble in methylene chloride, chloroform, acetone or ethanol. Based on method of preparation, the product was a polydimethylsiloxane-polyamide block copolymer having chemically combined polydimethylsiloxane blocks and polyamide blocks joined by

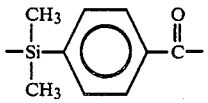

linkages. An opaque polymer film was obtained by melt pressing the material at 200° C./7000 psi. It was useful as tough rubber elastomer.

Although the above examples are directed to only a few of the very many variables which can be used in the practice of the method of the present invention, the present invention is directed to a much broader variety of organopolysiloxane-polyamide block copolymers and methods of making such materials as shown in the description preceding these examples.

What I claim as new and desire to secure by Letters Patent of the United States is:

1. A method for making organopolysiloxane-polyamide block polymers which comprises
   (1) effecting reaction under interfacial polymerization conditions between an aqueous solution of an organo diamine or organo silicon diamine and an organic solvent solution of a poly(diorganosiloxane) having an average of about 7 to 2000 chemically combined diorganosiloxy units and terminal groups of the formula

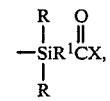

or a mixture of such polydiorganosiloxane and organic polyacidhalide, where the reaction is conducted in the presence of a basic intercondensation catalyst and the polydiorganosiloxane is the reaction product of the corresponding silanol terminated polydiorganosiloxane and halosilylaroylhalide, and
   (2) recovering organopolysiloxane block polymer from the resulting organic phase, where R is a member selected from the class consisting of halogen, $C_{(1-13)}$ monovalent hydrocarbon radicals, substituted $C_{(1-13)}$ monovalent hydrocarbon radicals and mixtures thereof, $R^1$ is selected from divalent $C_{(6-13)}$ aromatic organic radicals, and X is a halogen radical.

2. A method in accordance with claim 1, where the diamine is an organic diamine.

3. A method in accordance with claim 1, where the diamine is a bisaminoalkylene terminated polydiorganosiloxane.

4. A method in accordance with claim 1, where the diamine is bisaminosilane.

5. A method in accordance with claim 1, where the diamine is N',N-diethylenediamine.

6. A method in accordance with claim 1, where the bisamine is hexamethylene diamine.

7. A method in accordance with claim 1, where the polydiorganosiloxane is a polydimethylsiloxane having terminal groups of the formula,

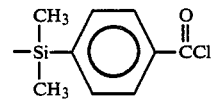

8. A method in accordance with claim 1, where the organic polyacid halide is adipyl chloride.

* * * * *